United States Patent
Kumar et al.

(10) Patent No.: US 12,356,355 B2
(45) Date of Patent: *Jul. 8, 2025

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Lalith Kumar, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

This patent is subject to a terminal disclaimer.

(21) Appl. No.: 17/931,240

(22) Filed: Sep. 12, 2022

(65) Prior Publication Data

US 2023/0007610 A1 Jan. 5, 2023

Related U.S. Application Data

(63) Continuation of application No. 16/844,769, filed on Apr. 9, 2020, now Pat. No. 11,445,462.

(30) Foreign Application Priority Data

Apr. 9, 2019 (IN) .............................. 201941014310
Mar. 20, 2020 (IN) .............................. 201941014310

(51) Int. Cl.
*H04W 60/00* (2009.01)
*H04W 12/06* (2021.01)

(52) U.S. Cl.
CPC ........... *H04W 60/00* (2013.01); *H04W 12/06* (2013.01)

(58) Field of Classification Search
CPC ..... H04W 60/00; H04W 12/60; H04W 12/12; H04W 12/06; H04W 36/00226;
(Continued)

(56) References Cited

U.S. PATENT DOCUMENTS

| | | | |
|---|---|---|---|
| 10,827,448 B2 | 11/2020 | Kim et al. | |
| 10,880,341 B1* | 12/2020 | Rehmat | ................ H04W 88/06 |
| 11,277,809 B2* | 3/2022 | Ramle | ................... H04W 60/00 |
| 11,785,508 B2* | 10/2023 | Bakker | ............... H04L 65/1073 |
| | | | 370/331 |
| 11,856,423 B2* | 12/2023 | Kim | ..................... H04W 48/02 |

(Continued)

FOREIGN PATENT DOCUMENTS

| | | | |
|---|---|---|---|
| CN | 1543152 A | * | 11/2004 |
| CN | 101662458 A | | 3/2010 |

(Continued)

OTHER PUBLICATIONS

The First Office Action dated Feb. 8, 2024, in connection with Chinese Application No. 202080034174.3, 14 pages.

(Continued)

*Primary Examiner* — David Q Nguyen

(57) ABSTRACT

A method for performing communication in a wireless communication system in includes establishing, by a network entity, a context of a user equipment (UE) in a network, receiving a message for registration request from the UE in a registered state, identifying that the UE is genuine by executing an authentication procedure with the UE, and in case that the UE is genuine, performing a deletion of the established context of the UE and a process of the registration request.

8 Claims, 12 Drawing Sheets

(58) Field of Classification Search
CPC .............. H04W 36/0033; H04W 88/16; H04L 65/1063; H04L 65/1083
USPC .................... 370/328, 329, 330; 455/411
See application file for complete search history.

(56) References Cited

U.S. PATENT DOCUMENTS

| | | |
|---|---|---|
| 2005/0010680 A1 | 1/2005 | Zick et al. |
| 2012/0180119 A1 | 7/2012 | Bessis et al. |
| 2014/0295797 A1 | 10/2014 | Moisanen et al. |
| 2017/0318463 A1 | 11/2017 | Lee et al. |
| 2018/0343249 A1 | 11/2018 | Hahn et al. |
| 2018/0376444 A1 | 12/2018 | Kim et al. |
| 2019/0007500 A1 | 1/2019 | Kim et al. |
| 2020/0162968 A1 | 5/2020 | Huang-Fu et al. |
| 2020/0288320 A1 | 9/2020 | Kunz et al. |

FOREIGN PATENT DOCUMENTS

| | | |
|---|---|---|
| CN | 101754207 A | 6/2010 |
| CN | 105718805 A | 6/2016 |
| CN | 109314942 A | 2/2019 |
| WO | 2018089442 A2 | 5/2018 |

OTHER PUBLICATIONS

Communication pursuant to Article 94(3) EPC dated Dec. 7, 2022, in connection with European Patent Application No. 20787004.9, 5 pages.

Notification of the Decision to Grant a Patent Right for Patent Invention dated Jul. 12, 2024, in connection with Chinese Application No. 202080034174.3, 2 pages.

International Search Report and Written Opinion of the International Searching Authority in connection with International Application No. PCT/KR2020/004832 dated Jul. 17, 2020, 10 pages.

3GPP TS 24.501 V16.0.2 (Mar. 2019), Technical Specification, 3rd Generation Partnership Project; Technical Specification Group Core Network and Terminals; Non-Access-Stratum (NAS) protocol for 5G System (5GS); Stage 3; (Release 16), 480 pages.

Ericsson, "Correction to UE Radio Capability handling," S2-186163, 3GPP TSG-SA2 Meeting #127bis, Newport Beach, US, May 27-Jun. 1, 2018, 11 pages.

Nokia, et al., "Correcting AMF behaviour for Service Request that is not integrity protected," S2-1903668, SA WG2 Meeting #132, Xi'an, PRC, Apr. 8-12, 2019, 376 pages.

European Patent Office, "Supplementary European Search Report" issued May 6, 2022, in connection with European Patent Application No. 20787004.9, 11 pages.

3GPP TS 33.501 v0.7.0 (Jan. 2018) Technical Specification; 3rd Generation Partnership Project; Technical Specification Group Services and System Aspects; Security Architecture and Procedures for 5G System (Release 15); 109 pages.

Office Action dated Oct. 30, 2024, in connection with Korean Application No. 10-2021-7036690, 6 pages.

Communication under Rule 71(3) EPC dated May 16, 2025, in connection with European Patent Application No. 20787004.9, 43 pages.

3GPP TS 24.501 V16.0.1 (Mar. 2019), Mar. 2019, 480 pages.

\* cited by examiner

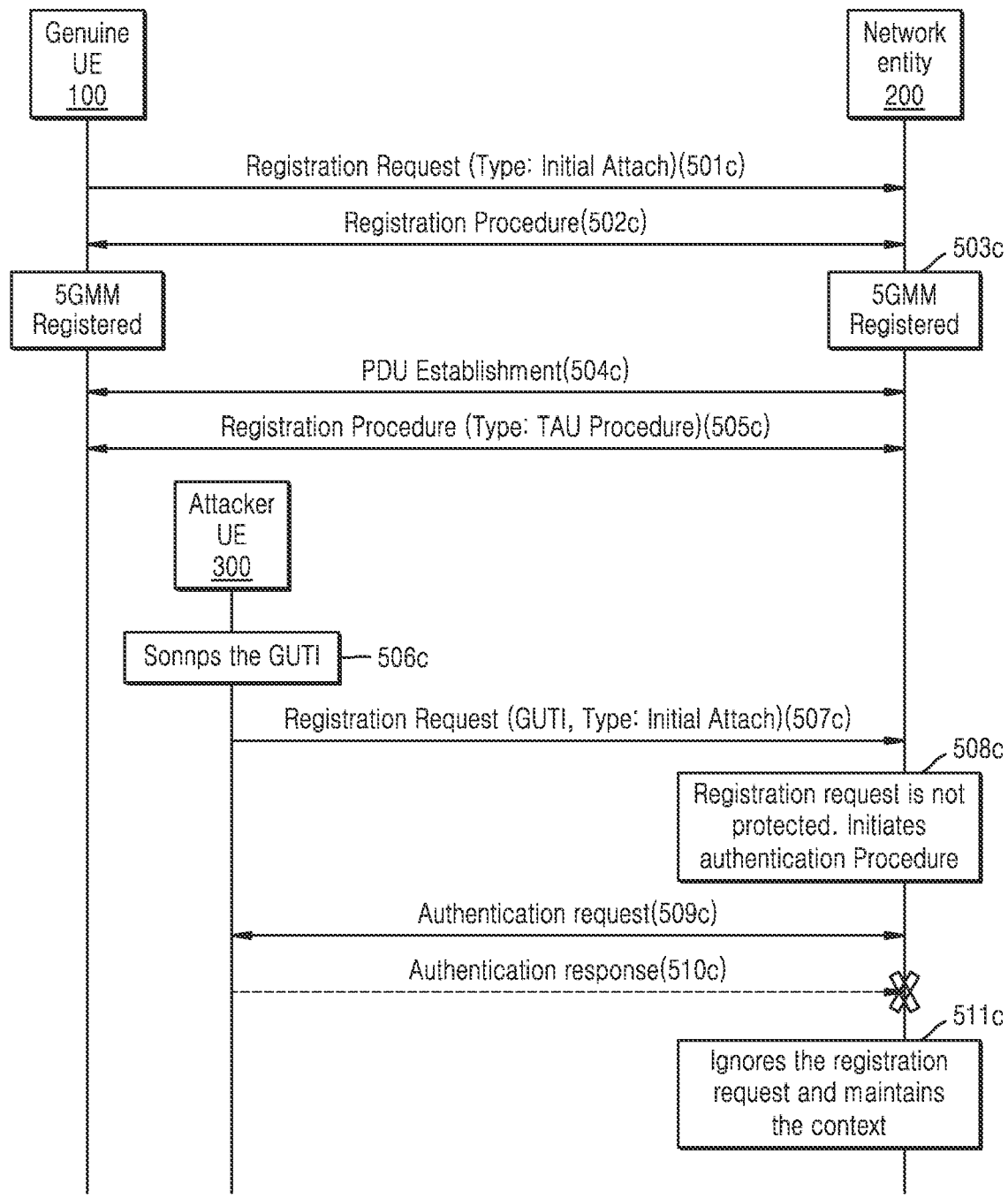

1. If Second attach message is received in EMM-REGISTERED state.
2. UE's state in AMF is moved to EMM-DEREGISTERED state. i.e. all the UE context's are deleted and only then attach procedure is executed.

METHOD AND APPARATUS FOR PERFORMING COMMUNICATION IN WIRELESS COMMUNICATION SYSTEM

CROSS REFERENCE TO RELATED APPLICATIONS

This application is a continuation of application Ser. No. 16/844,769, filed Apr. 9, 2020, now U.S. Pat. No. 11,445,462, which is based on, and claims priority under 35 U.S.C. § 119 to Indian Application Number 201941014310 filed on Apr. 9, 2019, and Indian Application Number 201941014310 filed on Mar. 20, 2020, the disclosures of which is hereby incorporated by reference herein.

BACKGROUND

1. Field

Certain embodiments according to the present disclosure relate to wireless communication, and more particularly to systems and methods for managing context of a user equipment (UE) in a wireless network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human-centered connectivity network, where humans generate and consume information, is now evolving to an Internet of things (IoT), where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

Certain embodiments according to the present disclosure provide a system and method for managing a context of user equipment (UE) in a wireless network.

Certain embodiments according to the present disclosure determine whether the UE is genuine or not by executing an authentication procedure with the UE when the network entity receives, an attach request message from the UE in a registered state.

Various embodiments according to the present disclosure re-register the UE with the network entity and delete an old context of the UE in the registered state only when the network entity determines that the UE is genuine.

Some embodiments according to the present disclosure deny the registration request of the UE and continue with the old context of the UE in the registered state when the network entity determines that the UE is not genuine.

Various embodiments according to the present disclosure determine by the network entity whether the UE is genuine by verifying a unique identifier of the UE when the network entity receives, the attach request message from the UE in the registered state.

Accordingly, some embodiments according to this disclosure comprise a system and method for managing a context of user equipment (UE) (100) in a wireless network. The method includes receiving, by a network entity (200), a registration request message from the UE (100) requesting for re-registering with the wireless network and determining, by the network entity (200), whether the UE (100) is genuine by executing an authentication procedure with the UE (100). Further, the method includes performing, by the network entity (200) one of: re-registering the UE (100) with the network entity (200) by deleting an old context of the UE (100) in the registered state in response to determining that the UE (100) is genuine and denying the registration request of the UE (300) and continuing with a current context of the UE (100) in the registered state in response to determining that the UE (300) is not genuine.

Accordingly, embodiments according to this disclosure include embodiments where the network entity receives a registration request message from the UE in the registered state. In some embodiments, the network entity determines whether the UE is genuine by verifying a unique identifier of the UE. Further, in some embodiments, the UE gets re-registered with the network entity by deleting an old context of the UE in the registered state when the network entity determines that the UE is genuine. The network entity may deny the registration request of the UE and continue with the current context of the UE in the registered state when the network entity determines that the UE is not genuine.

Accordingly certain embodiments described herein include a network entity (200) for managing context of user equipment (UE) (100) in a wireless network. The network entity (200) includes a memory (240); a communicator (220) coupled to the memory (240) and a processor (260) coupled to the memory (240) and the communicator (220). The communicator (220) is configured to receive a registration request message from the UE (100) requesting for re-registering with the wireless network, where the UE (100) is in a registered state with the wireless network. The processor (260) is configured to determine whether the UE (100) is genuine by executing an authentication procedure with the UE (100) and perform one of: re-register the UE (100) with the network entity (200) by deleting an old context of the UE (100) in the registered state in response to determining that the UE (100) is genuine, and deny the request of the UE (300) and continue with a current context of the UE (100) in the registered state in response to determining that the UE (300) is not genuine.

Accordingly some embodiments described herein include a network entity (200) for managing context of user equipment (UE) (100) in a wireless network. The network entity (200) includes a memory (240); a communicator (220) coupled to the memory (240) and a processor (260) coupled to the memory (240) and the communicator (220). The communicator (220) is configured to receive a registration request message from the UE (100) requesting for re-registering with the wireless network, where the UE (100) is in a registered state with the wireless network. The processor (260) is configured to determine whether the UE (100) is genuine by verifying the unique identifier of the UE (100) and perform one of: re-register the UE (100) with the network entity (200) by deleting an old context of the UE (100) in the registered state in response to determining that the UE (100) is genuine, and deny the registration request of the UE (300) and continuing with a current context of the UE (100) in the registered state in response to determining that the UE (300) is not genuine.

These and other aspects of embodiments according to this disclosure will be better appreciated and understood when considered in conjunction with the following description and the accompanying drawings. It should be understood, however, that the following descriptions, are given by way of illustration and should not be construed as being limitative of the scope of the disclosure as a whole. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Certain embodiments according to the present disclosure are illustrated in the accompanying drawings, throughout which, like reference letters indicate corresponding parts in the various figures. The embodiments herein will be better understood from the following description with reference to the drawings, in which:

FIG. 5C illustrates an example of a mechanism of the attacker UE (300) trying to register to the network entity (200) which does not result in the denial of service at the UE (100), according to certain embodiments of this disclosure;

DETAILED DESCRIPTION

Figure 1:
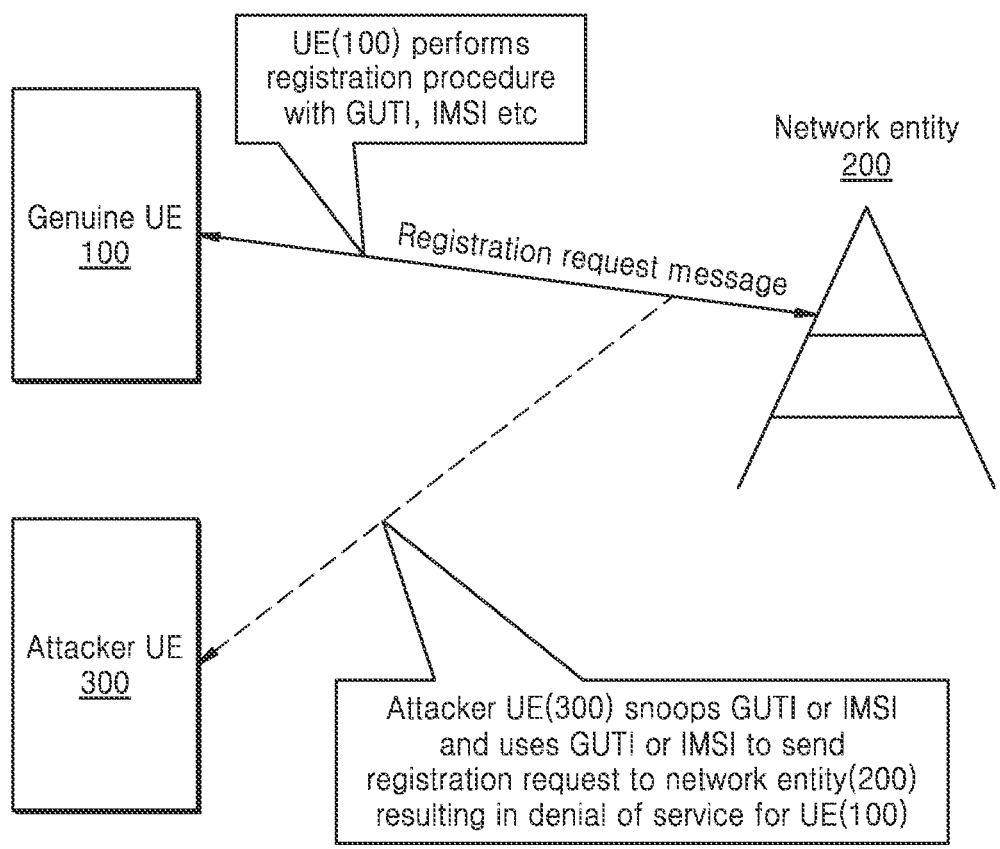
FIG. 1 illustrates an example of a genuine UE (100) trying to register with a network entity (200) and an attacker UE (300) trying to snoop a registration detail of the genuine UE (100)

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In general, advances in technology have resulted in a proliferation of users of wireless user equipment, and a concomitant rise in the sophistication of attacks on user equipment. As number of wireless communication users increases, the security aspect associated with wireless communication also has increased drastically. The security aspect associated with wireless communication includes attacks launched by hackers such as Denial of Service (DoS), Man in Middle (MIM) attack, phishing, data theft, etc. The attacks launched by hackers have serious repercussions when the number of wireless communication users is very large as the attack launched by the hackers can bring down the processing capacity of a wireless communication network impacting the wireless communication users. Further, the attacks launched by hackers can also lead to blockage of services to the wireless communication users causing discomfort.

For example, consider a genuine User Equipment (UE) (100) is trying to register with a network entity (200) of the wireless communication network by sending a registration request message (as shown in FIG. 1). The registration request message comprises at least one of a globally unique temporary identity (GUTI), a subscription concealed identifier (SUCI), any identity (the UE identifier or a subscription identifier) like an International Mobile Subscriber Identity (IMSI), an International Mobile Equipment Identity (IMEI), the GUTI, the SUCI etc. Further, consider that an attacker UE (300) snoops and acquires the GUTI/IMSI when the genuine UE (100) sends the registration request message to the network entity (200). When the UE is in registered state with the network, the UE is expected to execute TRACKING AREA UPDATE procedure to update any incremental changes in the UE context to the network. This will allow the network to keep updating the latest registration area and MM context of the UE. In general conditions it is not expected that the UE will trigger an attach procedure or initial registration procedure with the network as the UE is already registered with the network. Attach and initial registration procedures are executed to create the UE context in the network and not to update the context, it is obvious that after the context is created, these procedures are not expected to be executed.

However, to handle certain abnormal cases, current art allows the UE to trigger attach or initial registration procedure though a UE in the registered state with the network (for example, the situations in which the UE was not able to trigger detach and get deregistered with the network and the UE locally gets into deregistered state, (i.e., if the UE had accidentally been dropped, had its battery removed, or had been switched off). In such abnormal situations, a UE may not have an opportunity to indicate to the network that it is moving to a deregistered state. A further example of a UE not indicating its switch to a deregistered state arises if a user triggered the power off button when the UE is in an out of service area again in this situation the UE will do the local detach.

Thus, in certain known networks, whenever the network receives the attach message or initial registration message when a user equipment's context is available and in a registered state, the network will assume that the UE has faced some abnormal situation and due to which, it has deleted its context and has gone to deregister state locally and now the UE is trying to register again or attach with the network. As a response to this step, the network deletes the UE context it has because the network assumes that the old context for the UE maintained at the network has already been deleted at the UE.

An attacker UE can exploit the current art procedure for handling context in abnormal situations in the UE. Specifically, in one form of attack, the attacker UE (300) sends the initial registration request message or attach message to the network entity (200) using a snooped GUTI/IMSI of the genuine UE (100), which leads to deletion of a context of the genuine UE (100) by the network entity (200), because the network entity assumes that UE has faced abnormal situation and it is trying to register again. The next step the network executes is an authentication procedure, but the authentication procedure will fail as the procedure gets executed by the attacker UE. However, the damage is already done on network side and the UE context is already lost. As a result, when there is an incoming call to the genuine UE (100), the actions of the attacker UE imply that there is no context of the UE available with the network, the incoming call is denied to the genuine UE (100). The denial of service to the genuine UE (100) due to the attacker UE (300) is of serious concern and causes inconvenience to the users.

Thus, it is desired to address the above mentioned disadvantages or other shortcomings or at least provide a useful alternative.

A UE (100) is a genuine UE (100) which is authorized to communicate with a network entity (200). For the purposes of this disclosure, the UE (100) and genuine UE (100) refers to the same device, and may be used interchangeably. A UE (300) is an attacker UE (300) which snoops and acquires GUTI/IMSI when the genuine UE (100) sends a registration request message to the network entity (200). Throughout the specification the UE (300) and the attacker UE (300) refers to the same device, and may be used interchangeably.

Accordingly, certain embodiments according to this disclosure comprise a system and method managing a context of the UE in the wireless network. Embodiments include a network entity receiving a registration request message from a UE in a registered state. Further, certain embodiments include the network entity determining the UE is genuine by executing an authentication procedure with the UE. Further, at least one embodiment includes the UE getting re-registered with the network entity by deleting an old context of the UE in the registered state when the network entity determines that the UE is genuine. In certain embodiments, the network entity continue with the current context of the UE in the registered state when the network entity determines that the UE is not genuine.

In some embodiments according to this disclosure, the registration of the UE with the network entity by deleting the old context of the UE in the registered state in response to determining that the UE is genuine includes the network entity accepting the registration request message sent by the UE, then the network entity creates a new context of the UE and replaces the old context of the UE with the new context of the UE. In certain embodiments, the method further includes re-registering the UE with the network entity in the wireless network.

In some embodiments according to this disclosure, the registered state of the UE is one of an Evolved Packet System (EPS) Mobility Management (EMM)-registered state and a 5GMM-registered state.

In some embodiments according to this disclosure, the old and the new context of the UE correspond to at least one of an EMM context, EPS bearer contexts, EPS security context, a 5GMM context, a 5G security context, a 5G Non-Access-Stratum (NAS) security context, 5GS security contexts, a Protocol Data Unit (PDU) session context.

In some embodiments according to this disclosure, determining by the network entity whether the UE is genuine using the authentication procedure before the deleting the UE context mitigates a denial of service (DoS) attack caused by the attach message.

Attention is now directed to the drawings and more particularly to FIGS. 2 through 5C, where similar reference characters denote corresponding features consistently throughout the figure.

Figure 2:
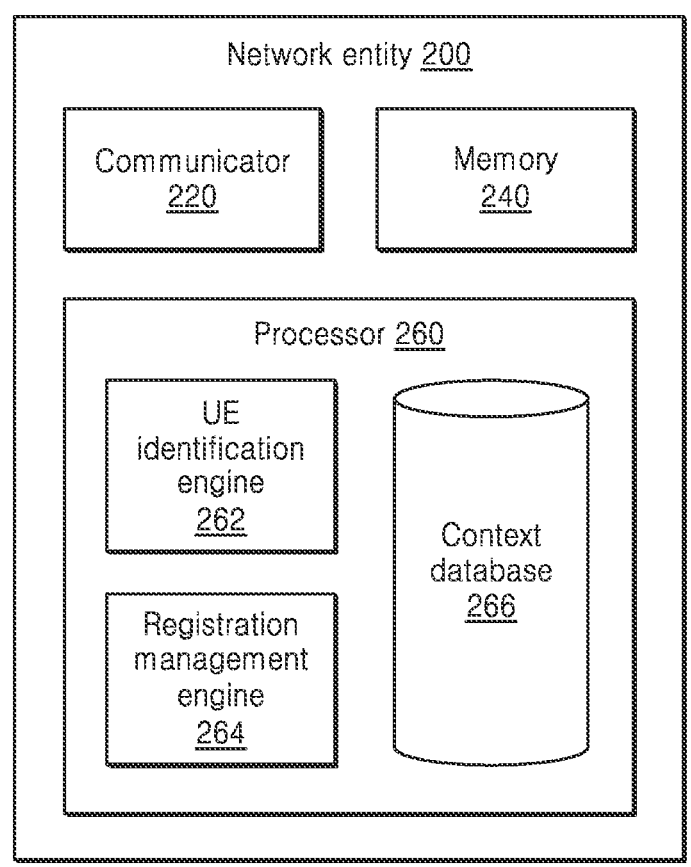
FIG. 2 illustrates, in block diagram format, an example of a network entity (200) for managing a context of the user equipment (UE) (100) in a wireless network, according to certain embodiments of this disclosure.

FIG. 2 illustrates, in block diagram format, an example of a network entity (200) for managing a context of the user equipment (UE) (100) in a wireless network, according to certain embodiments of this disclosure.

Consider that the UE (100) is in a registered state with the wireless network and an old context of the UE (100) is currently available with the network entity (200).

Referring to the non-limiting example of FIG. 2, the network entity (200) includes a communicator (220), a memory (240) and a processor (260).

In some embodiments according to this disclosure, the communicator (220) is coupled to the memory (240) and is configured to receive an attach request message from the UE (100). The registered state of the UE (100) is one of an Evolved Packet System (EPS) Mobility Management (EMM)-registered state and a 5GMM-registered state.

In some embodiments according to this disclosure, memory (240) may include one or more computer-readable storage media. The memory (240) may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the memory (240) may, in some examples, be considered a non-transitory storage medium. The term "non-transitory" may indicate that the storage medium is not embodied in a carrier wave or a propagated signal. However, the term "non-transitory" should not be interpreted that the memory (240) is non-movable. In some examples, the memory (240) can be configured to store larger amounts of information than a memory (240). In certain examples, a non-transitory storage medium may store data that can, over time, change (e.g., in Random Access Memory (RAM) or cache).

The processor (260) is coupled to the memory (240) and the communicator (220), and the processor (260) includes a unique identification engine (262), a registration management engine (264) and a context database (266). The processor (260) is configured to determine whether the UE (100) is genuine by executing an authentication procedure with the UE (100). The processor (260) on determining that the UE (100) is genuine is configured to register the UE (100) with the network entity (200) by deleting the old context of the UE (100) in a registered state. When the registered state of the UE (100) is EMM registered, then the old context of the UE (100) which is deleted, include an EMM context, an EPS bearer contexts. When the registered state of the UE (100) is 5GMM registered, then the old context of the UE (100), which is deleted, includes a 5GMM context.

The processor (260), upon determining that the UE (100) is not genuine, is configured to deny the attach request message of the UE (100) and continue with a current context of the UE (100) in the registered state.

Further, in certain embodiments, the processor (260) is also configured to register the UE (100) with the network entity (200) by deleting the old context of the UE (100) in the registered state in response to determining that the UE (100) is genuine and the processor (260) accept the attach request message sent by the UE (100), create a new context of the UE (100), replace the old context of the UE (100) with the new context of the UE (100), register the UE (100) with the network entity (200) in the wireless network.

In some embodiments, processor (260) can also determine whether the UE (100) is genuine by verifying a unique identifier of the UE (100). The unique identifier of the UE (100) may be a Media Access Control (MAC) address of the UE (100).

Although the example of FIG. 2 shows the hardware elements of the network entity (200), it should be understood that the present disclosure is not limited thereto. In other embodiments, the network entity (200) may include less or more number of elements. Further, the labels or names of the elements are used only for illustrative purpose and does not limit the scope of the disclosure. One or more components can be combined together to perform same or substantially similar function for performing registration of the UE (100) with integrity check in the wireless network.

Figure 3A:
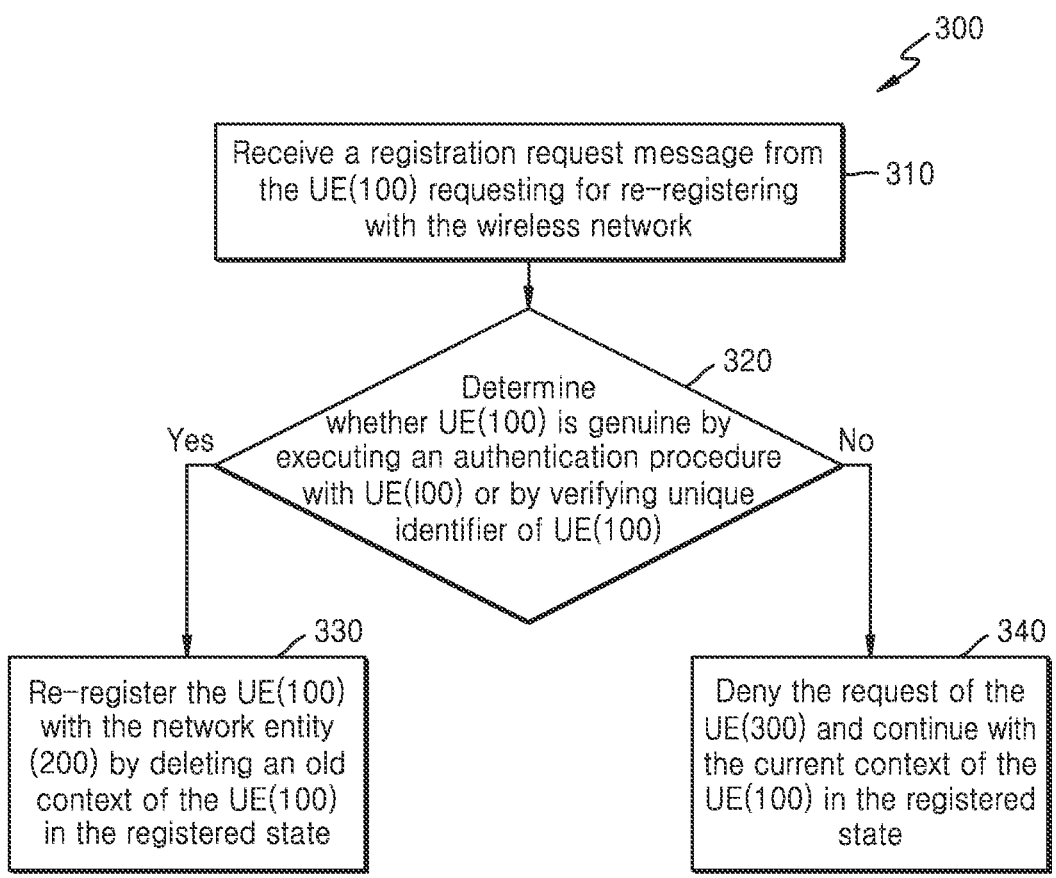
FIG. 3A illustrates operations of an example of a method for managing the context of the UE (100) in the wireless network, according to certain embodiments of this disclosure.

FIG. 3A illustrates, through flow chart 300, an example of a method for managing the context of the UE (100) in a wireless network, according to certain embodiments of this disclosure.

Referring to the non-limiting example of FIG. 3A, at step 310, the network entity (200) receives the registration request message from the UE (100) in the registered state. For example, in the UE (100) as illustrated in FIG. 2, the communicator (220) is configured to receive the registration request message from the UE (100) in the registered state.

At step 320, the network entity (200) determines whether the UE (100) is genuine by executing an authentication procedure with the UE (100). For example, in the network entity (200) as illustrated in the FIG. 2, the UE identification engine (262) is configured to determine whether the UE (100) is genuine by executing the authentication procedure with the UE (100).

In certain embodiments, at step 330, in response to determining that the UE (100) is genuine, the network entity (200) registers the UE (100) by deleting the old context of the UE (100) in the registered state. For example, in the network entity (200) as illustrated in FIG. 2, the registration management engine (264) is configured to register the UE (100) by deleting the old context of the UE (100) in the registered state, in response to determining that the UE (100) is genuine.

At step 340, in response to determining that the UE (100) is not genuine, the network entity (200) denies the registration request message of the attacker UE (300) and continues with the current context of the UE (100) in the registered state. For example, in the network entity (200) as illustrated in the example of FIG. 2, the registration management engine (264) is configured to deny the registration request message of the attacker UE (300) and continue with the current context of the UE (100) in the registered state, in response to determining that the UE (100) is not genuine.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 3B:
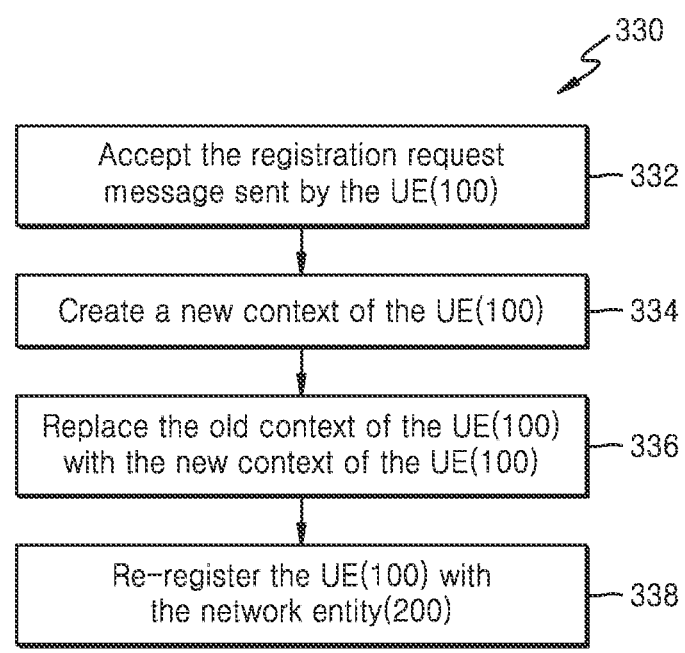
FIG. 3B illustrates a flow chart of a method for registering the UE (100) with the network entity (200) in a registered state for the genuine UE (100), according to certain embodiments of this disclosure.

FIG. 3B illustrates an example of details of an operation 330 for registering the UE (100) with the network entity (200) in the registered state for the genuine UE (100), according to certain embodiments of this disclosure.

Referring to the non-limiting example of FIG. 3B, at operation 332, the network entity (200) accepts the registration request message sent by the UE (100). For example, in the network entity (200) as illustrated in the FIG. 2, the registration management engine (264) is configured to accept the registration request message sent by the UE.

At step 334, the network entity (200) creates the new context of the UE (100). For example, in the network entity (200) as illustrated in the FIG. 2, the registration management engine (264) is configured to create the new context of the UE (100) in the context database (266).

At step 336, the network entity (200) replaces the old context of the UE (100) with the new context of the UE (100). For example, in the network entity (200) as illustrated in FIG. 2, the registration management engine (264) is configured to replace the old context of the UE (100) with the new context of the UE (100) in the context database (266).

At step 338, the network entity (200) completes the registration of the UE (100). For example, in the network entity (200) as illustrated in FIG. 2, the registration management engine (264) is configured to complete the registration of the UE (100).

Figure 4A:
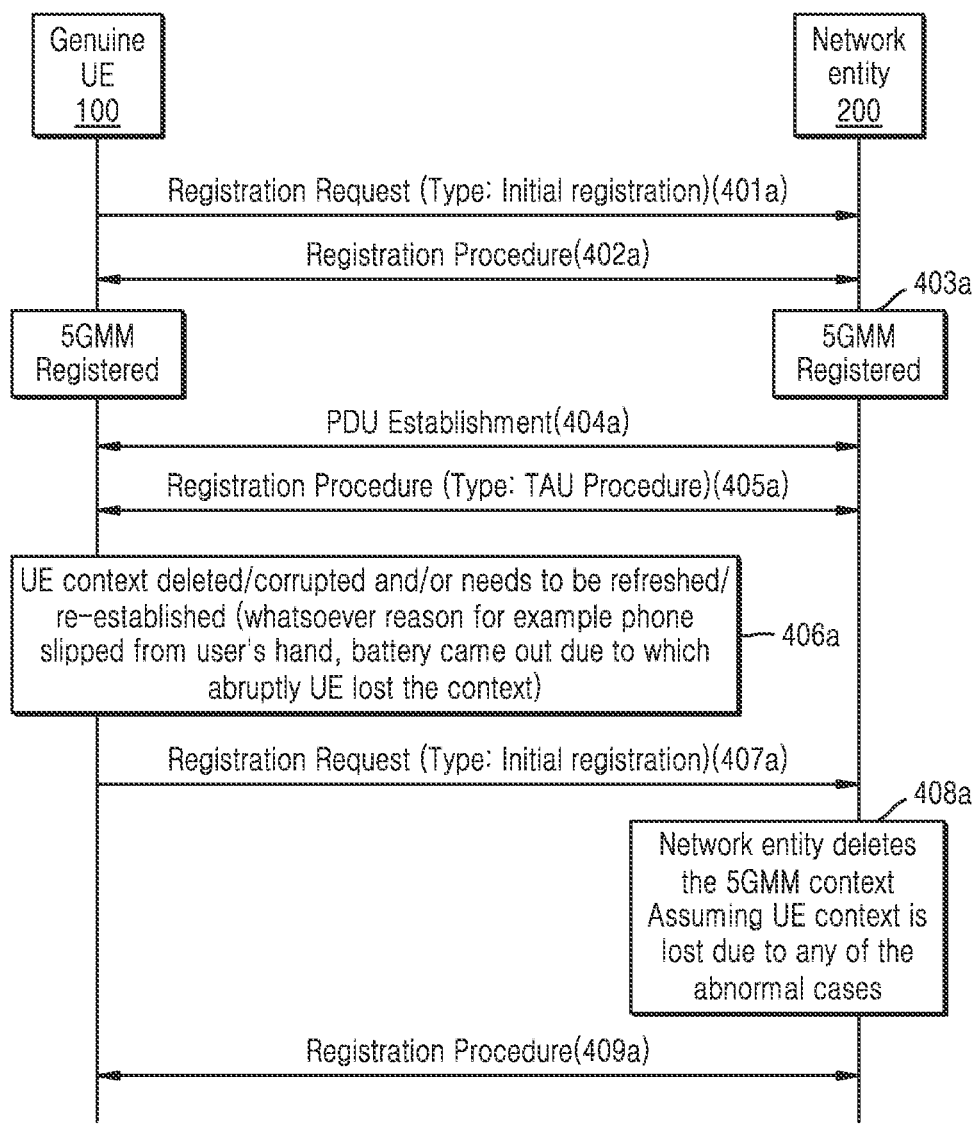
FIG. 4A illustrates an example of a mechanism of registering the UE (100) which is in the registered state to the network entity (200)

FIG. 4A illustrates an example of a mechanism of registering the UE (100) which is in the registered state to the network entity (200).

Referring to the example of FIG. 4A, at step 401a, consider that the UE (100) performs a registration to the network entity (200) by sending the attach message i.e., the UE (100) sends the registration request message with 5G standalone access registration type IE set to "initial registration". The registration request message comprises at least one of a globally unique temporary identity (GUTI), subscription concealed identifier (SUCI), any identity (device or subscription identifier) like International Mobile Subscriber Identity ("IMSI"), International Mobile Equipment Identity ("IMEI"), "GUTI", "SUCI" etc.

At step 402a, upon receiving the registration request message from the UE (100), the network entity (200) performs the registration procedure and at step 403a, the UE (100) is registered with the 5G network (for example, a 5GMM registered by the network entity (200)). During the registration of the UE (100) by the network entity (200), the UE context comprising information regarding at least one of the Access and the Mobility Management Function (AMF), Session Management Function (SMF) and the Unified Data Management (UDM) is stored in the network entity (200). Further, at step 404a, a Protocol Data Unit (PDU) session is established between the UE (100) and the network entity (200) by performing the PDU procedure. Further, at step 405a, a periodic Tracking Area Update (TAU) procedure is performed as part of the registration procedure by the UE (100).

At step 406*a*, consider an event which leads to the UE context being deleted at the UE (100). The event may be one or more of: the UE context (100) is corrupted, the UE context needs to be refreshed or the UE context needs to be re-established with the network entity (200) or any such emergency situations. For example, consider that the UE (100) which is already registered with the network entity (200) hangs up, the UE (100) slipped out of user's hand and the battery was detached, due to which, the UE (100) is re-started, then the UE context gets deleted at the UE (100).

In certain conventional methods and systems, in response to the UE context being deleted at the UE (100), at step 407*a*, the UE (100) initiates the registration to the network entity (200) by sending a second attach message (for example, the UE (100) sends a second registration request message with 5GS registration type IE set to "initial registration"). The network entity (200) determines that the UE (100) is already registered with the network entity (200) based on the old UE context which is stored at the context database (266). However, at step 408*a*, the network entity (200) deletes the old UE context of the UE (100) on receiving the second registration request message assuming that the UE (100) context is lost due to any of the abnormal cases. Further, at step 409*a*, the network entity (200) processes the second registration request message and creates a new UE context in the context database (266).

Figure 4B:
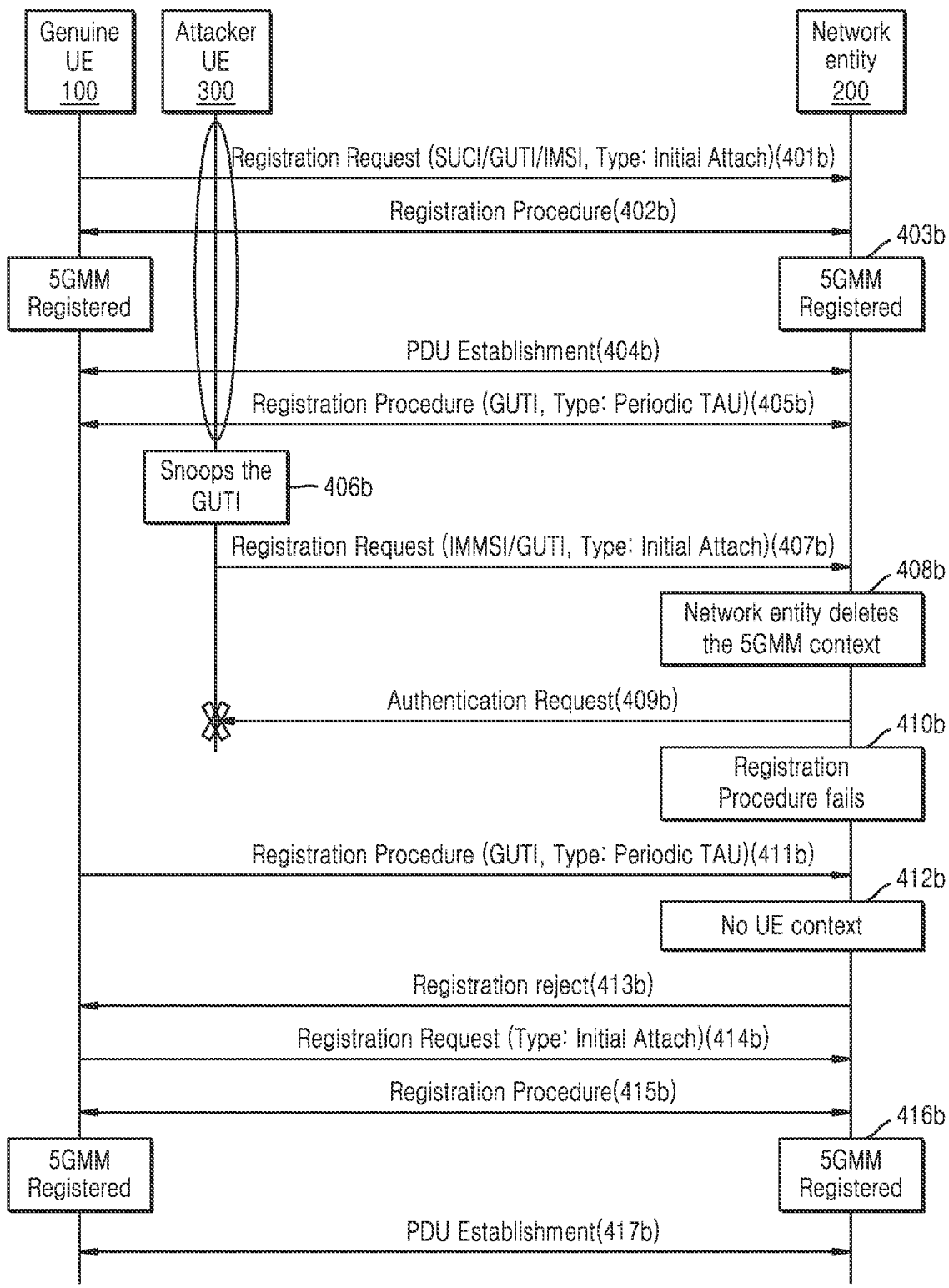
FIG. 4B illustrates an example of a mechanism of the attacker UE (300) trying to register to the network entity (200) resulting in a denial of service to the genuine UE (100)

FIG. 4B illustrates an example of a mechanism of an attacker UE (300) trying to register to the network entity (200) resulting in a denial of service at the UE (100), according to a known method.

Referring to the explanatory examples of FIG. 4B, in conjunction with FIG. 4A, at step 406*b*, consider the attacker UE (300) snoops the UE identity (for example, an IMSI) while the UE (100) performs the registration to the network entity (200) by sending the first attach message. Further, at step 407*b*, the attacker UE (300) sends the registration request message to the network entity (200) using the snooped UE identity.

At step 408*b*, the network entity (200), in response to receiving the registration request message from the attacker UE (300), conventionally deletes the UE context which is associated with the UE (100). Further, at step 409*b*, the network entity (200) initiates an authentication procedure with the attacker UE (300) based on the registration request message. However, since the attacker UE (300) does not have all the parameters required for completing the authentication procedure, at 410*b*, the authentication procedure fails leading to the failure of the registration of the attacker UE (300) to the network entity (200).

Further, at step 411*b*, the UE (100) attempts to perform a periodic TAU procedure with the network entity (200). Since the network entity (200) has deleted the UE context, at step 413*b*, the registration of the UE (100) is rejected by the network entity (200). Also, the UE (100) will miss a mobile terminated (MT) paging as the network entity (200) does not have the UE context. Further, the mobile originated (MO) service of the UE (100) will have to re-register and create the PDU session context again to be able to operate MO services.

For example, consider an incoming call to the UE (100) during a period of time when the UE context has been deleted by the network entity (200). The UE (100) will not receive the incoming call as the network entity (200) denies the incoming call to the UE (100) due to the absence of the UE context at the network entity (200). The denial of service to the UE (100) due to the attacker UE (300) sending the second registration request to the network entity (200) causes inconvenience to the users, and is a serious concern which needs to be addressed.

Figure 5A:
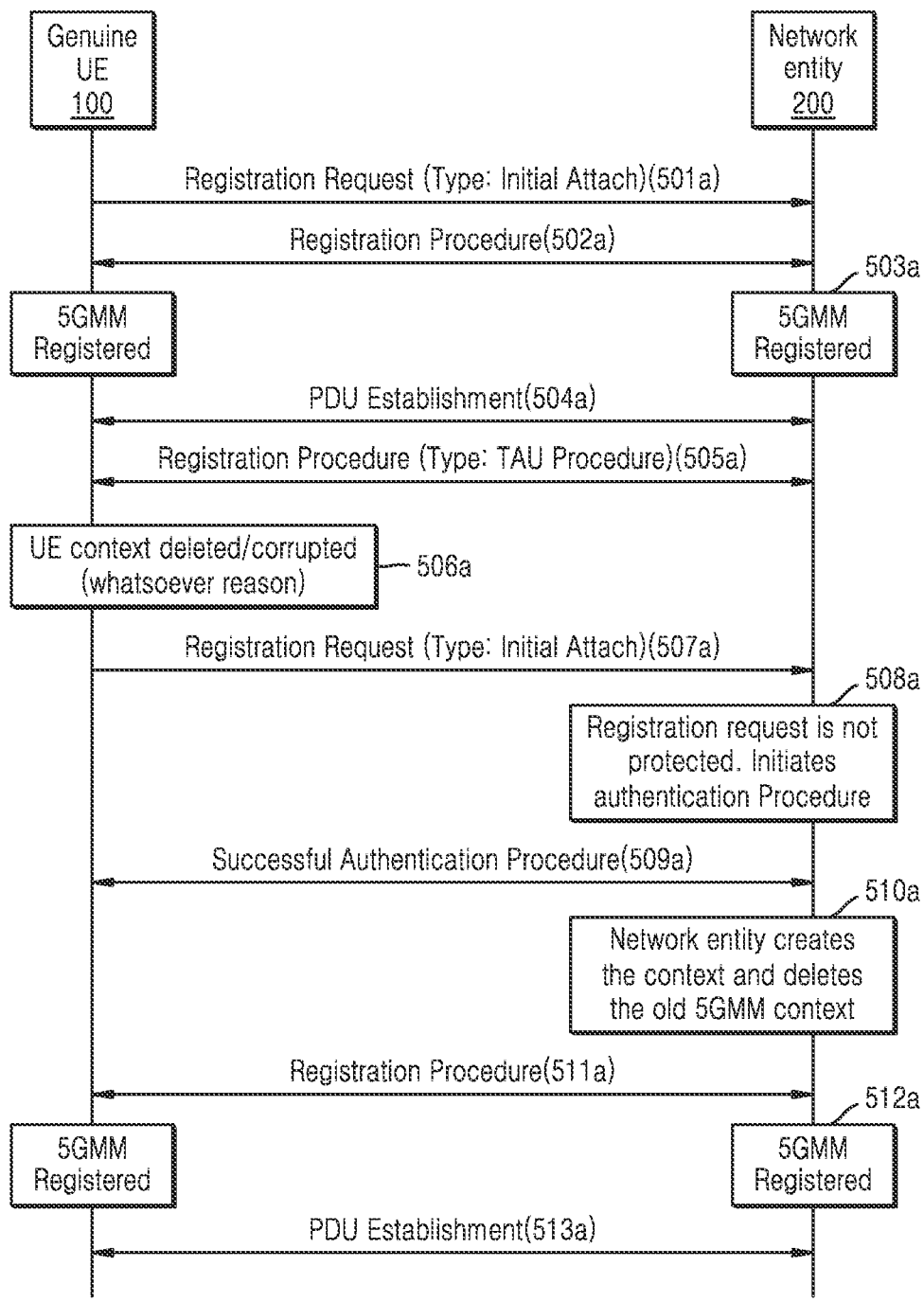
FIG. 5A illustrates an example of mechanism of registering the UE (100) which is in the registered state to the network entity (200) based on an authentication procedure, according to certain embodiments of this disclosure.

FIG. 5A illustrates an example of a mechanism of registering the UE (100) which is in the registered state to the network entity (200) based on an authentication procedure, according to certain embodiments of this disclosure.

Referring to the non-limiting example of FIG. 5A, at step 501*a*, consider that the UE (100) performs a registration to the network entity (200) by sending the attach message i.e., the UE (100) sends a registration request message with 5GS registration type IE set to "initial registration". The registration request message comprises at least one of globally unique temporary identity (GUTI), subscription concealed identifier (SUCI), any identity (device or subscription identifier) like "IMSI", "IMEI", "GUTI", "SUCI" etc.

At step 502*a*, on receiving the registration request message from the UE (100), the network entity (200) performs the registration procedure and at step 503*a*, the UE (100) is 5GMM registered in the network entity (200). During the registration of the UE (100) in the network entity (200), the UE context comprising at least one of the EMM context, the EPS bearer contexts, the EPS security context, the 5GMM context, the 5G security context, the 5G Non-Access-Stratum (NAS) security context, the 5GS security contexts, the Protocol Data Unit (PDU) session context.

Further, at step 505*a*, the periodic TAU procedure is performed as part of the registration procedure. At step 506*a*, consider an event which leads to the UE context being deleted at the UE (100). The event may be one of: the UE context is corrupted, the UE context needs to be refreshed or the UE context needs to be re-established with the network entity (200) or any such emergency situations.

At step 507*a*, in response to the UE context being deleted at the UE (100), the UE (100) initiates the registration to the network entity (200) by sending the second attach message i.e., the UE (100) sends the second registration request message with the 5GS registration type IE set to "initial registration". The registration request message comprises at least one of globally unique temporary identity (GUTI), subscription concealed identifier (SUCI), any identity (device or subscription identifier) like "IMSI", "IMEI", "GUTI", "SUCI" etc.

According to certain embodiments, at step 508*a*, the network entity (200) determines that the registration request may not be protected as the UE (100) is already registered with the network entity (200) and hence receiving the second registration request from the registered UE (100) may be suspicious at the network entity (200). Further, the network entity (200) initiates and executes the authentication procedure with the UE (100). During the authentication procedure, the network entity (200) will determine whether the UE (100) is genuine. At step 509*a*, the network entity (200) determines that the authentication procedure is successful as the second registration request is received from the genuine UE (100). At step 510*a*, on determining that the UE (100) is genuine, the network entity (200) creates the new context of the UE (100) and then deletes the old context of the UE (100) in the registered state and replaces the old context of the UE (100) with the new context of the UE (100). The new context replacing the old context is only an illustrative example, before the new context is created, the old context can also be deleted by the network entity, which provides the same behavior.

At step 511*a*, the network entity (200) performs the registration procedure in response to the second registration request received from the UE (100) and at step 512*a*, the UE (100) is 5GMM registered with the network entity (200). Further, at step 513a, the PDU session is established between the UE (100) and the network entity (200) by performing the PDU procedure.

Figure 5B:
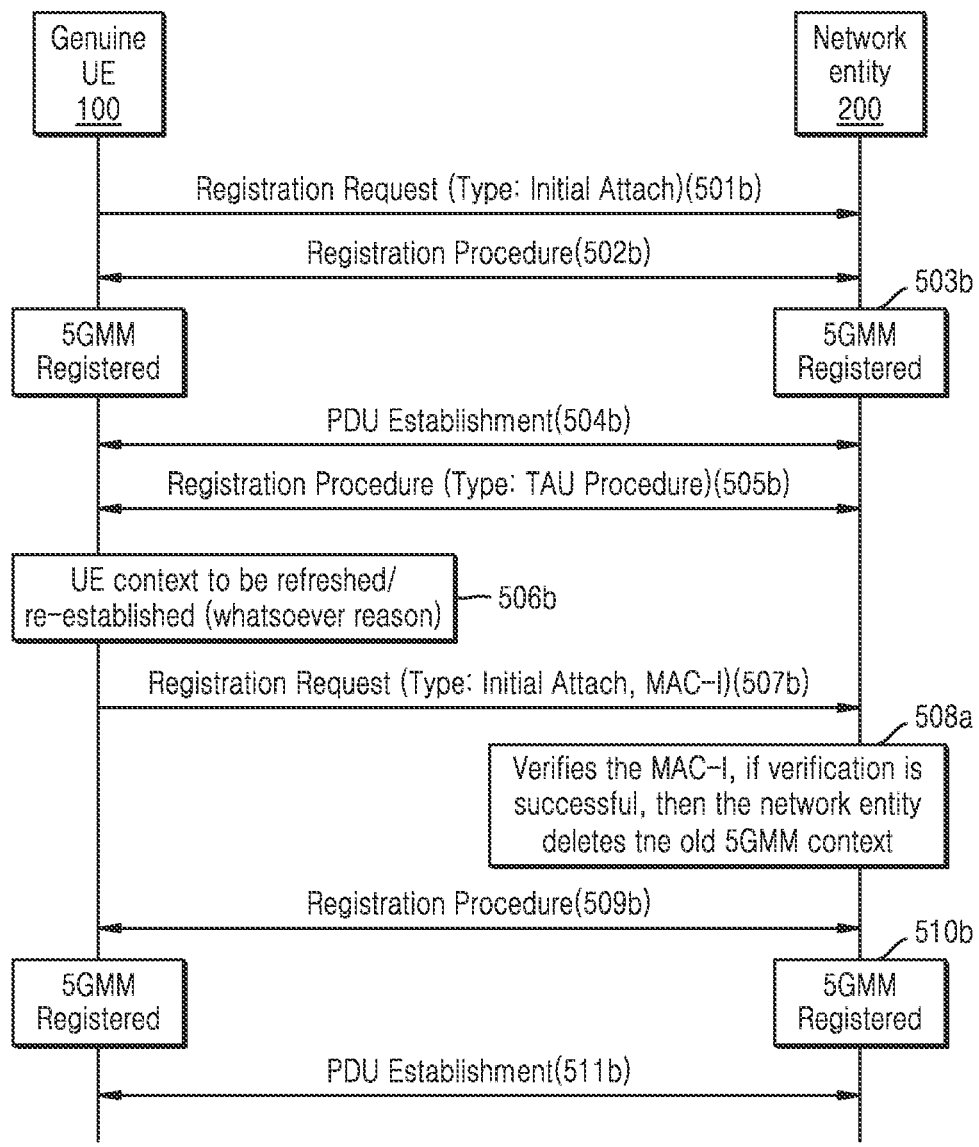
FIG. 5B illustrates an example of a mechanism of registering the UE (100) which is in the registered state to the network entity (200) based on the verification of a unique identifier of the UE (100), according to certain embodiments of this disclosure.

FIG. 5B illustrates an example of a mechanism of registering the UE (100) which is in the registered state to the network entity (200) based on the verification of the unique identifier of the UE (100), according to certain embodiments of this disclosure.

Referring to the non-limiting example of FIG. 5B, at step 501b, consider that the UE (100) performs the registration to the network entity (200) by sending the attach message i.e., the UE (100) sends the registration request message with 5GS registration type IE set to "initial registration". The registration request message comprises at least one of a globally unique temporary identity (GUTI), subscription concealed identifier (SUCI), or any identity (device or subscription identifier) like "IMSI", "IMEI", "GUTI", "SUCI" etc. At step 502b, on receiving the registration request message from the UE (100), the network entity (200) performs the registration procedure and at step 503b, the UE (100) is 5GMM registered in the network entity (200).

During the registration of the UE (100) in the network entity (200), the UE context comprising at least one of the EMM context, the EPS bearer contexts, the EPS security context, the 5GMM context, the 5G security context, the 5G Non-Access-Stratum (NAS) security context, the 5GS security contexts, the Protocol Data Unit (PDU) session context. Further, at step 504b, the PDU session is established between the UE (100) and the network entity (200) by performing the PDU procedure. Further, at step 505b, the periodic TAU procedure is performed as part of the registration procedure.

At step 506b, consider the event which leads to the UE context being deleted at the UE (100). The event may be, without limitation, one of the UE context (100) being corrupted, the UE context needing to be refreshed or the UE context needing to be re-established with the network entity (200) or any such emergency situations. In response to the UE context being deleted at the UE (100), at step 507b, the UE (100) initiates the registration to the network entity (200) by sending the second attach message, (for example, the UE (100) sends the second registration request message with 5GS registration type IE set to "initial registration" and also sends the Media Access Control (MAC) address of the UE (100)). The MAC address of the UE (100) is, in certain embodiments, used as the unique identifier of the UE (100). At step 508b, on receiving the registration request message and the MAC address from the UE (100), the network entity (200) verifies the MAC address of the UE (100) and determines whether the UE (100) is genuine.

On determining that the UE (100) is genuine, the network entity (200) creates the new context of the UE (100) and then deletes the old context of the UE (100) in the registered state and replaces the old context of the UE (100) with the new context of the UE (100) in the context database (266). At step 509b, the network entity (200) performs the registration procedure in response to the second registration request which is received from the UE (100) and at step 510b, the UE (100) is 5GMM registered with the network entity (200). Further, at step 511b, the PDU session is established between the UE (100) and the network entity (200) by performing the PDU procedure.

FIG. 5C illustrates an example of a mechanism by which an attacker UE (300) tries to register to the network entity (200), but which does not result in the denial of service at the UE (100), according to certain embodiments of this disclosure.

Referring to the non-limiting example of FIG. 5C, at step 501c, consider that the UE (100) performs a registration to the network entity (200) by sending the attach message i.e., the UE (100) sends a registration request message with 5GS registration type IE set to "initial registration". The registration request message comprises at least one of globally unique temporary identity (GUTI), subscription concealed identifier (SUCI), or an identity (device or subscription identifier) such as, "IMSI", "IMEI", "GUTI", "SUCI," etc.

According to certain embodiments, at step 502c, upon receiving the registration request message from the UE (100), the network entity (200) performs the registration procedure and at step 503c, the UE (100) is 5GMM registered in the network entity (200). Further, at step 504c, the PDU session is established between the UE (100) and the network entity (200) by performing the PDU procedure. Further, at step 505c, the periodic TAU procedure is performed as part of the registration procedure.

At step 506c, consider the attacker UE (300) snoops the GUTI/IMSI while the UE (100) performs the registration to the network entity (200) by sending the attach request message. Further, at step 507c, the attacker UE (300) sends the registration request message to the network entity (200) using the snooped GUTI/IMSI. At step 508c, the network entity (200), in response to receiving the registration request message from the attacker UE (300), initiates the authentication procedure with the UE (300). At step 509c, the network entity (200) sends the authentication request to the attacker UE (300), helping the network entity (200) to determine whether the UE (300) is genuine.

At step 510c, upon receiving the authentication request sent by the network entity (200), the attacker UE (300) sends the authentication response to the network entity (200). However, since the attacker UE (300) does not have all the parameters required for completing the authentication procedure, the authentication procedure fails leading to the failure of the registration of the attacker UE (300) to the network entity (200). Further at step 511c, the network entity (200) ignores the registration request from the attacker UE (300), since it determines that the UE (300) is not genuine, and maintains the UE context of the genuine UE (100).

Therefore, unlike conventional methods and systems, certain embodiments according to this disclosure strategically avoid denial of service at the UE (100) by performing the authentication procedure before deleting the context of the UE (100) on receiving the attach request. Hence, in a scenario when the attacker UE (300) sends the attach request message to the network entity (200) with the intention of conducting a denial of service attack, the denial of service attack is thwarted by the network entity (200) by not deleting the old context of the registered UE (100) before performing the authentication procedure.

Figure 6A:
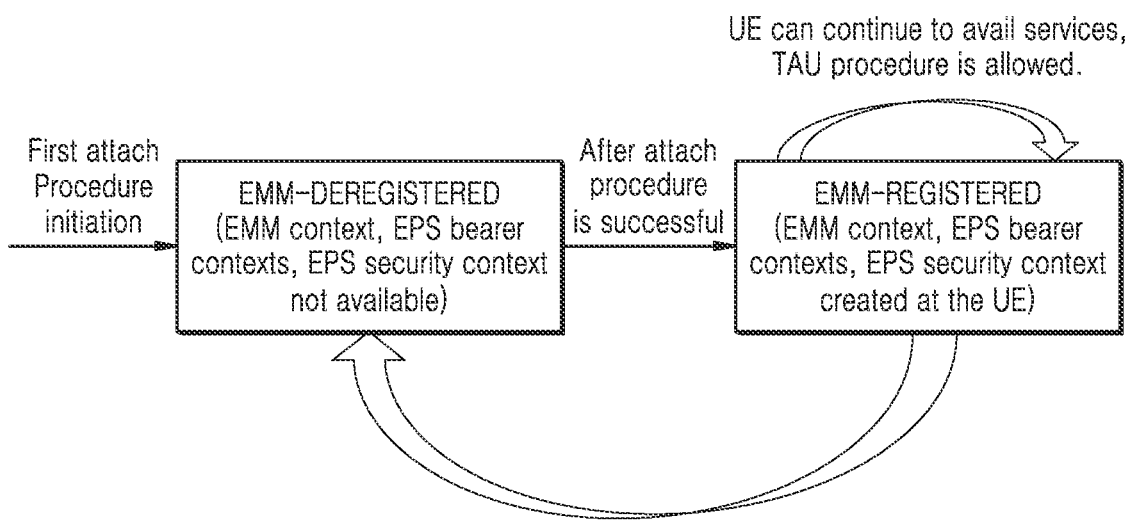
FIG. 6A is a state transition diagram illustrating examples various states associated with the registered UE (100) trying to re-register with the wireless network.

FIG. 6A is a state transition diagram illustrating an example of various states associated with the registered UE (100) trying to re-register with the wireless network.

Referring to the example of FIG. 6A, in the existing methods and systems, in state 1, the network entity (200) receives the first attach procedure initiation request. The attach procedure is only processed in a EMM de-registered state. Further, the network entity (200) determines that the attach procedure is successful and moves the UE (100) into the EMM registered state. In the EMM registered state, the network entity (200) creates, for example, the EMM context, the EPS bearer contexts, and the EPS security context, for the UE (100). The UE (100) is capable of availing various services such as call, Short Message Service (SMS), the Tracking Area Update (TAU) procedure, etc.

At state 2, consider that the network entity (200) receives the second attach request message from the UE (100) then the network entity (200) shifts the state of the UE (100) from the EMM registered state to the EMM de-registered state (back to state 1). When the UE (100) is moved to the EMM de-registered state, the current context of the UE (100) is deleted at the network entity (200) and only the attach procedure is executed by the network entity (200).

Figure 6B:
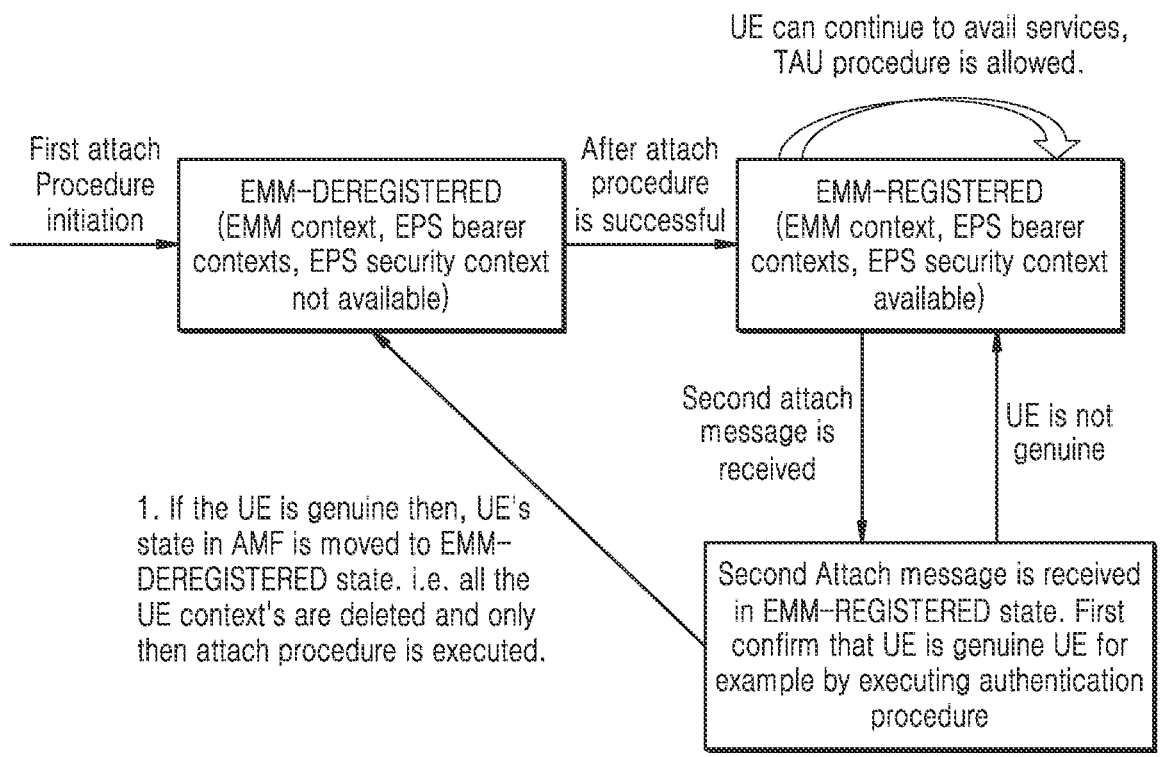
FIG. 6B is a state transition diagram illustrating examples of various states associated with the registered UE (100) trying to re-register with the wireless network, according to certain embodiments of this disclosure.

FIG. 6B is a state transition diagram illustrating an example of various states associated with the registered UE (100) trying to re-register with the wireless network, according to certain embodiments of this disclosure.

Referring to the non-limiting example of FIG. 6B in conjunction to the FIG. 6A, in state 1, the network entity (200) receives the first attach procedure initiation request. The attach procedure is only processed in a EMM de-registered state. Further, the network entity (200) determines that the attach procedure is successful and moves the UE (100) into the EMM registered state. In the EMM registered state, the network entity (200) creates, for example, the EMM context, the EPS bearer contexts, the EPS security context, for the UE (100). The UE (100) is capable of availing various services such as call, SMS, the TAU procedure, etc.

According to certain embodiments, in state 2, consider that the network entity (200) receives the second attach request message from the UE (100) then the network entity (200) determines whether the UE (100) is genuine for example by executing the authentication procedure. In case the UE (100) is genuine, then the network entity (200) continues the attach procedure and shifts the state of the UE (100) from the EMM registered state to the EMM de-registered state (back to state 1). When the UE (100) is moved to the EMM de-registered state, the current context of the UE (100) is deleted at the network entity (200) and only the attach procedure is executed by the network entity (200).

In the case where the UE (100) is not genuine, then the network entity (200) continues to maintain the UE (100) in the EMM registered state (state 2) and does not delete the context of the UE (100).

Figure 7:
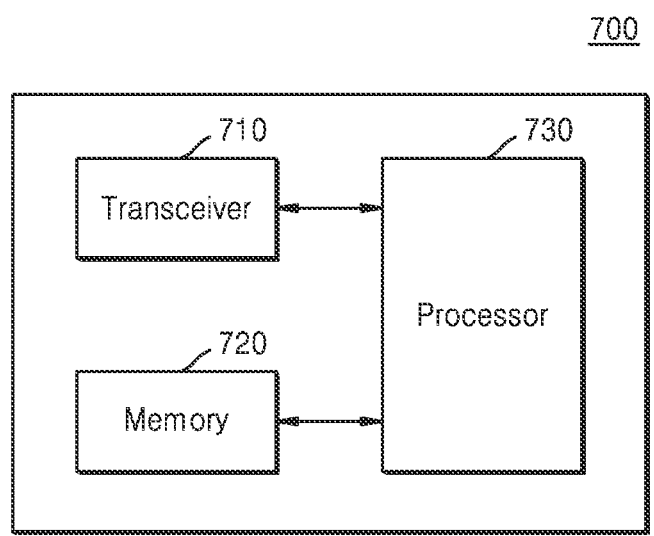
FIG. 7 is a block diagram of a user equipment (UE, 700), according to certain embodiments of this disclosure.

FIG. 7 illustrates, in block diagram format, an example of a user equipment (UE, 700), according to certain embodiments of this disclosure.

Referring to the non-limiting example of FIG. 7, the UE (700) includes a transceiver (710), a memory (720) and a processor (730).

In some embodiments according to this disclosure, the transceiver (710) is coupled to the processor (730) and is configured to transmit an attach request message or a registration request message with a 5GS registration type IE set to "initial registration" or an attach request message in a registered state. The registered state of the UE (700) is one of an Evolved Packet System (EPS) Mobility Management (EMM)-registered state and a 5GMM-registered state.

In some embodiments according to this disclosure, memory (720) may include one or more computer-readable storage media. The memory (720) may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the memory (720) may, in some examples, be considered a non-transitory storage medium. The term "non-transitory" may indicate that the storage medium is not embodied in a carrier wave or a propagated signal. However, the term "non-transitory" should not be interpreted that the memory (720) is non-movable. In some examples, the memory (240) can be configured to store larger amounts of information than a memory (720). In certain examples, a non-transitory storage medium may store data that can, over time, change (e.g., in Random Access Memory (RAM) or cache).

The processor (730) is coupled to the memory (720) and the transceiver (710). The processor (730) is configured to execute an authentication procedure with the network entity (200). In case that the UE (700) is genuine, the UE (700) is registered with the network entity (200) based on a deletion the old context of the UE (700) in a registered state. When the registered state of the UE (700) is EMM registered, then the old context of the UE (700), which is deleted include a EMM context, a EPS bearer contexts, etc. When the registered state of the UE (700) is 5GMM registered, then the old context of the UE (100), which is deleted include a 5GMM context.

In the case that the UE (700) is not genuine, the attach request message of the UE (700) is denied and a current context of the UE (100) in the registered state is maintained.

FIG. 7 illustrates one example the hardware elements of the UE (700), and it is to be understood that other embodiments are not limited to the embodiments shown in FIG. 7. In some embodiments, the UE (700) may include fewer or more elements than shown in the example of FIG. 7. Further, the labels or names of the elements are used only for illustrative purposes and do not limit the scope of the disclosure. One or more components can be combined together to perform same or substantially similar function for performing registration of the UE (700) with integrity check in the wireless network.

The embodiments disclosed herein can be implemented through at least one software program running on at least one hardware device and performing network management functions to control the elements. The elements shown in the figures include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications, such specific embodiments without departing from the scope and spirit of this disclosure, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a network entity performing communication in a wireless communication system, the method comprising:

receiving, from a UE in a first registered state, a message for a second registration request;

determining whether the UE is a genuine UE, which has already been in the first registered state, by executing an authentication procedure with the UE;

in case that the UE is the genuine UE, deleting established context associated with the first registered state, and establishing a new context associated with the second registration request; and in case that the UE is not the genuine UE, maintaining the established context associated with the first registered state.

2. The method of claim 1, wherein the first registered state is one of: an Evolved Packet System (EPS) Mobility Management (EMM)-registered state or a 5th generation system (5GS) mobility management (5GMM)-registered state.

3. The method of claim 1, wherein the established context associated with the first registered state includes at least one of: Evolved Packet System (EPS) Mobility Management (EMM) context, EPS bearer contexts, or 5th generation system (5GS) mobility management (5GMM) context.

4. The method of claim 1, wherein the executing of the authentication procedure is performed when the message for the second registration request is a registration request message with a 5th generation system (5GS) registration type IE set to "initial registration" or an attach request message.

5. A network entity for performing communication in a wireless communication system, the network entity comprising:

a transceiver; and a processor coupled with the transceiver and configured to:

receive, from a UE in a first registered state, a message for a second registration;

determine whether the UE is a genuine UE, which has already been in the first registered state, by executing an authentication procedure with the UE;

in case that the UE is the genuine UE, delete established context associated with the first registered state, and establishing a new context associated with the second registration request; and in case that the UE is not the genuine UE, maintain the established context associated with the first registered state.

6. The network entity of claim 5, wherein the first registered state is one of: an Evolved Packet System (EPS) Mobility Management (EMM)-registered state or a 5th generation system (5GS) mobility management (5GMM)-registered state.

7. The network entity of claim 5, wherein the established context associated with the first registered state includes at least one of: Evolved Packet System (EPS) Mobility Management (EMM) context, EPS bearer contexts, or 5th generation system (5GS) mobility management (5GMM) context.

8. The network entity of claim 5, wherein executing the authentication procedure is performed when the message for the second registration request is a registration request message with a 5th generation system (5GS) registration type IE set to "initial registration" or an attach request message.

* * * * *